(12) United States Patent
Chang et al.

(10) Patent No.: US 8,606,682 B1
(45) Date of Patent: Dec. 10, 2013

(54) SYSTEM FOR PROVIDING A CORRELATION INDEX

(71) Applicant: Bank of America Corporation, Charlotte, NC (US)

(72) Inventors: Karen L. Chang, New York, NY (US); Peter J. Williams, New York, NY (US); Yonathan Epelbaum, Brooklyn, NY (US); Vincent Ronsil, New York, NY (US); Michael Ebert, New York, NY (US); Edward Mok, Englewood Cliffs, NJ (US); Chiyan Luo, Great Neck, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/690,508

(22) Filed: Nov. 30, 2012

Related U.S. Application Data

(60) Provisional application No. 61/601,425, filed on Feb. 21, 2012.

(51) Int. Cl.
*G06Q 40/00* (2012.01)
(52) U.S. Cl.
USPC .......................................... 705/36 R; 705/37
(58) Field of Classification Search
USPC ................................................ 705/36 R, 37
See application file for complete search history.

(56) References Cited

U.S. PATENT DOCUMENTS

| | | | | |
|---|---|---|---|---|
| 7,788,166 | B2 * | 8/2010 | Vischer et al. | 705/37 |
| 2007/0282758 | A1 * | 12/2007 | Vischer et al. | 705/36 R |
| 2008/0120250 | A1 * | 5/2008 | Hiatt, Jr. | 705/36 R |
| 2009/0012788 | A1 | 1/2009 | Gilbert et al. | |
| 2010/0141662 | A1 | 6/2010 | Storey et al. | |

FOREIGN PATENT DOCUMENTS

RU   2008137398   3/2010

OTHER PUBLICATIONS

Automatic speech facial gestures. Oct. 6, 2011 http://speechanimator.ru.

* cited by examiner

*Primary Examiner* — Olabode Akintola
(74) *Attorney, Agent, or Firm* — Michael A. Springs

(57) ABSTRACT

A system includes a memory and a processor communicatively coupled to the memory. The memory stores a correlation index that is based at least in part on a portfolio of index options, a plurality of stock options, and a plurality of deltas computed using a plurality of constant flat implied volatilities. The processor determines a value of the correlation index by selecting a plurality of strike prices for each of the index and stock options, computing a constant flat implied volatility for an index and a plurality of stocks on a first date, and computing the plurality of deltas using the plurality of constant flat implied volatilities.

20 Claims, 2 Drawing Sheets

SYSTEM FOR PROVIDING A CORRELATION INDEX

CROSS-REFERENCE TO RELATED APPLICATION

This application claims the benefit of priority under 35 U.S.C. §119(e) of U.S. Provisional Application Ser. No. 61/601,425, entitled "SYSTEM FOR PROVIDING A CORRELATION INDEX," filed Feb. 21, 2012.

TECHNICAL FIELD OF THE INVENTION

This disclosure generally relates to trading and more specifically to a system for providing a correlation index.

BACKGROUND OF THE INVENTION

Traditional trading systems allow traders to pursue various investment schemes, including correlation trading. In correlation trading, an investor may buy or sell options on an index and on the individual constituents of the index. In addition, an investor may buy or sell variance swaps on the index and on the individual constituents. However, correlation trading is often complicated and is thus prohibitive to many investors.

SUMMARY OF THE INVENTION

In accordance with the present invention, the disadvantages and problems associated with prior trading systems with respect to correlation trading have been substantially reduced or eliminated.

In some embodiments, a system includes a memory and a processor communicatively coupled to the memory. The memory stores a correlation index that is based at least in part on a portfolio of index options, a plurality of stock options, and a plurality of deltas computed using a plurality of constant flat implied volatilities. The processor determines a value of the correlation index by selecting, using a predetermined standard deviation range, a plurality of strike prices for each of the index and stock options, computing, using the selected strike prices, a flat implied volatility for an index and a plurality of stocks, and holding the computed flat implied volatilities constant over a predetermined time period, thereby creating the plurality of constant flat implied volatilities. The processor further determines the correlation index value by computing the plurality of deltas using the plurality of constant flat implied volatilities, computing a daily profit and loss (P&L) based on a change in a value of the portfolio of index and stock options, the plurality of deltas, an interest on cost to borrow stock, and an interest on funding, and determining the correlation index value based at least in part on a previous correlation index value and the computed daily P&L.

The invention has several important technical advantages. Various embodiments of the invention may have none, some, or all of these advantages. One advantage is that the trading system provides a correlation index that packages correlation trading into a single line item. The correlation index replicates variance swaps using, among other things, listed options and deltas computed using constant flat implied volatilities. As such, the correlation index reduces the complexity of correlation trading and thus provides access to correlation trading for investors who might otherwise be prohibited.

Other advantages of the present invention will be readily apparent to one skilled in the art from the description and the appended claims.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Correlation is the bridge that links index and single stock volatilities and can be approximated by the following formula:

$$\sqrt{\text{correlation}} \approx \frac{\text{Index Volatility}}{\text{Average Single Stock Volatility}}$$

This formula shows that the relative level of implied index and implied single stock volatilities give the approximate implied correlation.

Implied correlation in the equity market tends to trade at a significant premium to subsequent realized correlation due to the relative richness of index implied volatility. This makes selling correlation and/or buying dispersion a well performing trade with attractive return/risk ratios. Dispersion trades are usually structured as variance-to-variance strategies by selling index variance swaps and buying single stock variance swaps thus capturing the disconnect between index and single stock volatilities.

Traditional trading systems allow traders to pursue various investment schemes, including correlation trading. In correlation trading, an investor may buy or sell options on an index and buy or sell options on the individual constituents of the index. In addition, an investor may buy or sell variance swaps on the index and buy or sell variance swaps on the individual constituents. However, correlation trading is often complicated and is thus prohibitive to many investors.

The teachings of the disclosure recognize that it would be desirable to provide access to correlation trading that is less complicated and easier to execute and maintain. The following describes a system and method of providing a correlation index that packages correlation trading into a single line item. The correlation index replicates variance swaps using, among other things, listed options and deltas computed using constant flat volatilities. As such, the correlation index reduces the complexity of correlation trading and thus provides access to correlation trading for investors who might otherwise be prohibited.

Figure 1:
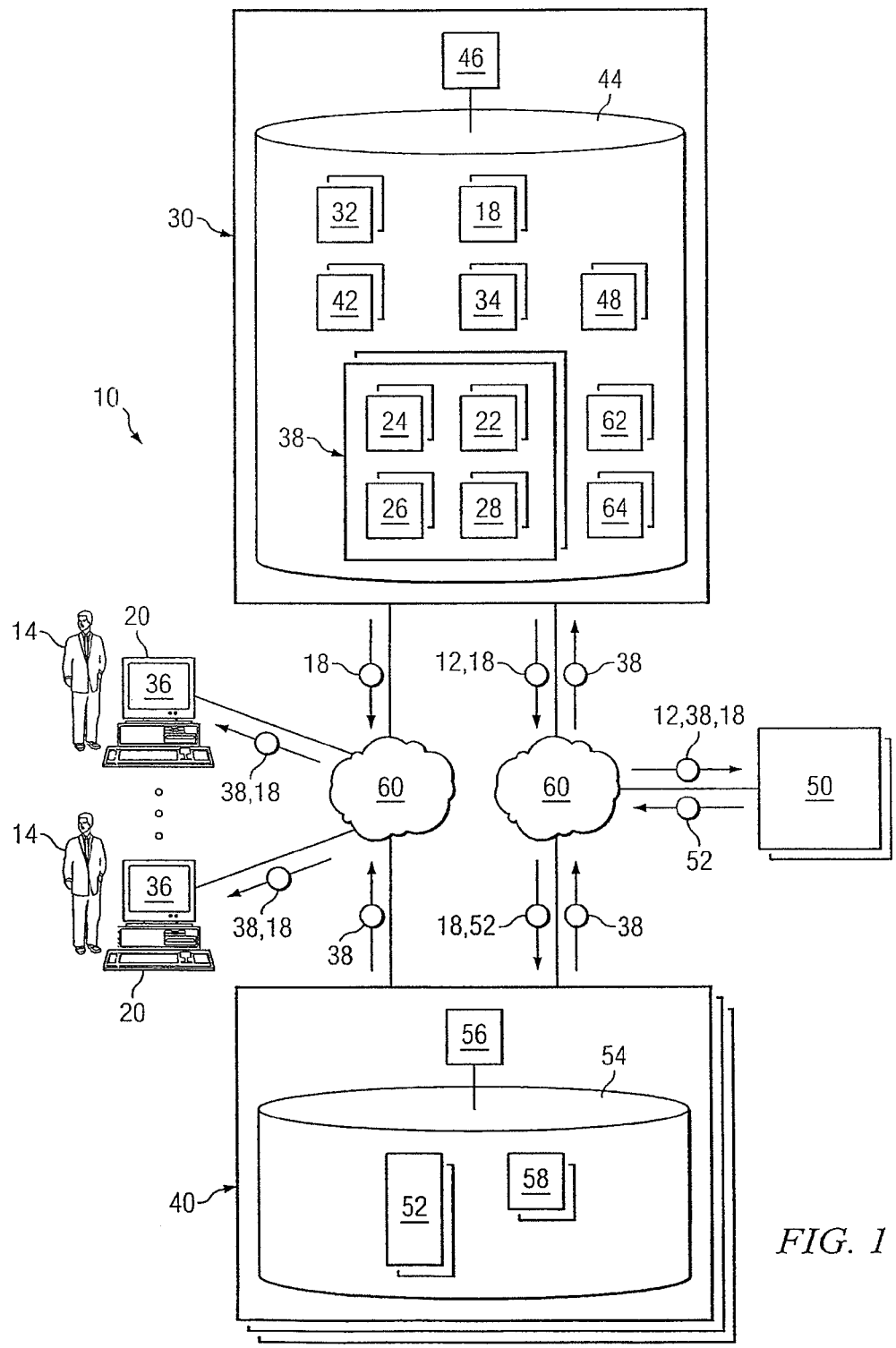
FIG. 1 illustrates a trading system for providing a correlation index, according to certain embodiments.

FIG. 1 illustrates a trading system 10, according to certain embodiments. Trading system 10 may comprise one or more clients 20, an index server 30, one or more market data servers 40, and one or more market centers 50 communicatively coupled by one or more networks 60.

Trading system 10 provides a correlation index 18. In general, correlation index 18 is based at least in part on stock options 26, index options 24, and deltas 42. As described in more detail below, deltas 42 are computed using constant flat volatilities that are computed on a start date (e.g., the tranche start date). The flat volatilities are held constant until an end date (e.g., the tranche end date).

Trading system 10 comprises one or more clients 20. Client 20 represents any suitable local or remote end-user device that may be used by traders 14 to access one or more elements of trading system 10, such as index server 30. Trader 14 may use client 20 to submit deposits, make withdrawals, request information, and/or communicate with various components of trading system 10. In some embodiments, trader 14 may use client 20 to trade correlation index 18 that is managed by index server 30. A particular client 20 may comprise a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of trading system 10. Client 20 may also comprise any suitable user interface such as a display, microphone, keyboard, or any other appropriate terminal equipment according to particular configurations and arrangements. It will be understood that trading system 10 may comprise any number and combination of clients 20. In some embodiments, client 20 may comprise a graphical user interface (GUI) 36.

GUI 36 is generally operable to tailor and filter data presented to trader 14. GUI 36 may provide trader 14 with an efficient and user-friendly presentation of trading orders 12, market data 38, and/or other suitable information. GUI 36 may comprise a plurality of displays having interactive fields, pull-down lists, and buttons operated by trader 14. In one example, GUI 36 presents relevant market data 38 to trader 14 and conceals the remaining information to reduce visual clutter. Then, upon receiving a request from trader 14, GUI 36 expands the visual representation of market data 38 to display account information, market information, and/or other suitable information. GUI 36 may include multiple levels of abstraction including groupings and boundaries. It should be understood that the term graphical user interface may be used in the singular or in the plural to describe one or more graphical user interfaces 36 and each of the displays of a particular graphical user interface 36.

Although clients 20 are described herein as being used by "traders," it should be understood that the term "trader" is meant to broadly apply to any user of trading system 10, whether that user is an agent acting on behalf of a principal, a principal, an individual, a legal entity (such as a corporation), or any machine or mechanism that is capable of participating in transactions in trading system 10.

Trader 14 may use client 20 to communicate with index server 30. Index server 30 is generally operable to provide correlation index 18. Based at least in part on the movement of market data 38, index server 30 is operable to update correlation index 18.

Index server 30 is operable to update correlation index 18 periodically (e.g., daily and/or any other suitable time period). In some embodiments, index server 30 re-calculates correlation index 18 on a daily basis. Index server 30 is operable to transmit a closing level of correlation index 18 to market data server 40.

Index server 30 may comprise any suitable combination of hardware and/or software implemented in one or more modules to provide the described functions and operations. In some embodiments, index server 30 may comprise a general-purpose personal computer (PC), a Macintosh, a workstation, a Unix-based computer, a server computer, or any suitable processing device. In some embodiments, the functions and operations described above may be performed by a pool of multiple index servers 30. A particular index server 30 may comprise an index memory 44 and an index processor 46.

Index memory 44 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as market data 38. Although FIG. 1 illustrates index memory 44 as internal to index server 30, it should be understood that index memory 44 may be internal or external to index server 30, depending on particular implementations. Also, index memory 44 may be separate from or integral to other memory devices to achieve any suitable arrangement of memory devices for use in trading system 10.

Index memory 44 is generally operable to store index logic 48. Index logic 48 generally comprises rules, algorithms, code, tables, and/or other suitable instructions for updating correlation index 18. Index memory 44 is further operable to store market data 38, correlation index 18, selected strikes 32, deltas 42, flat implied volatilities 34, daily profit and loss (P&L) 62, and interest on funding 64.

Index memory 44 is communicatively coupled to index processor 46. Index processor 46 is generally operable to execute index logic 48 stored in index memory 44 to calculate correlation index 18. Index processor 46 may comprise any suitable combination of hardware and software implemented in one or more modules to provide the described function or operation.

According to certain embodiments, index server 30 may trade the assets of correlation index 18. To trade the assets of correlation index 18, index server 30 may generate and transmit trading orders 12 to market center 50. Trading orders 12 may comprise orders to trade investment instruments such as, for example, equities, currencies, commodities, treasury notes, debt, credit, stocks, bonds, futures contracts, options, derivatives, and/or any suitable instrument. Trading orders 12 may comprise bids, offers, market orders, limit orders, stop loss orders, day orders, open orders, GTC ("good till cancelled") orders, "good through" orders, "all or none" orders, "any part" orders, or any other suitable order for trading.

Index server 30 may transmit trading orders 12 to one or more market centers 50. Market center 50 is generally operable to receive and execute trading orders 12. Once a particular trading order 12 is executed, market center 50 is operable to generate and transmit a trade confirmation message to index server 30. Market center 50 is further operable to transmit trading data 52 to market data server 40. Trading data 52 may comprise information regarding trading activities in market center 50. In particular, trading data 52 may comprise information regarding best bid prices, best offer prices, trading volumes, volatility, and/or any other suitable information regarding trading activity in market center 50. In some embodiments, trading data 52 represents raw data regarding conditions in market center 50.

Market centers 50 may comprise all manner of order execution venues including exchanges, Electronic Communication Networks (ECNs), Alternative Trading Systems (ATSs), market makers, or any other suitable market participants. Each market center 50 may maintain a bid and offer price for at least one investment instrument by standing ready, willing, and able to buy or sell that investment instrument at publicly quoted prices, also referred to as market center prices. Different market centers 50 may provide different market center prices for particular investment instruments. For example, a particular market center 50 may offer a particular bid price and/or offer price for a particular investment instrument, while another market center 50 may offer a different bid price and/or offer price for the same investment instrument.

Market center 50 may be communicatively coupled via network 60 to market data server 40. Market data server 40 is generally operable to receive and process trading data 52 from market center 50. Market data server 40 may process trading data 52 to generate market data 38. Market data 38 may comprise current and/or historical information regarding any suitable index, financial instrument, mutual fund, hedge fund, exchange traded fund ("ETF"), interest rate, investment instrument, trader 14, and/or any suitable number and combination of indicators regarding trading system 10. In particular, market data 38 may comprise current and/or historical values of stocks 22, index options 24, stock options 26, and strikes 28. In some embodiments, market data server 40 may be operated by a financial news service organization. In other embodiments, market data server 40 may be operated by a market maker, brokerage firm, bank, market center 50, and/or any suitable financial services entity.

Market data server 40 may comprise any suitable combination of hardware and/or software implemented in one or more modules to provide the described functions and operations. In some embodiments, market data server 40 may comprise a general-purpose personal computer (PC), a Macintosh, a workstation, a Unix-based computer, a server computer, or any suitable processing device. In some embodiments, the functions and operations described above may be performed by a pool of multiple market data servers 40. A particular market data server 40 may comprise a market data memory 54 and a market data processor 56.

Market data memory 54 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information. Although FIG. 1 illustrates market data memory 54 as internal to market data server 40, it should be understood that market data memory 54 may be internal or external to market data server 40, depending on particular implementations. Also, market data memory 54 may be separate from or integral to other memory devices to achieve any suitable arrangement of memory devices for use in trading system 10.

Market data memory 54 is generally operable to store trading data 52 from market centers 50. Market data memory 54 is further operable to store market data logic 58. Market data logic 58 generally comprises rules, algorithms, code, tables, and/or other suitable instructions for generating market data 38 based at least in part on trading data 52.

Market data memory 54 may be communicatively coupled to market data processor 56. Market data processor 56 is generally operable to execute market data logic 58 to generate market data 38. Market data processor 56 comprises any suitable combination of hardware and software implemented in one or more modules to provide the described function or operation.

As explained above, clients 20, index server 30, market data servers 40, and market centers 50 may be communicatively coupled via one or more networks 60. Network 60 may represent any number and combination of wireline and/or wireless networks suitable for data transmission. Network 60 may, for example, communicate internet protocol packets, frame relay frames, asynchronous transfer mode cells, and/or other suitable information between network addresses. Network 60 may include one or more intranets, local area networks, metropolitan area networks, wide area networks, cellular networks, all or a portion of the Internet, and/or any other communication system or systems at one or more locations.

It should be understood that the internal structure of trading system 10 and the servers, processors, and memory devices associated therewith is malleable and can be readily changed, modified, rearranged, or reconfigured to achieve the intended operations of trading system 10.

In operation, some embodiments of correlation index 18 are provided by index server 30 as described below. In general, correlation index 18 (hereinafter, the "Index") is designed to replicate the payoff of an investment in a variance-to-variance dispersion trade. Embodiments of the Index result in implied correlation through a position in a portfolio of single stock options 26 and a portfolio of S&P 500 (SPX) index options 24. In addition, the Index includes the result of "delta hedging" such a portfolio on a daily basis thus experiencing a cost of realized correlation. Each year, a new tranche (i.e., series) of the Index is created using a portfolio of SPX index options 24, single stock options 26 and deltas 42 (i.e., a new series of the Index may be launched each year, or any other appropriate time period). The choice of stocks 22 and strikes 28 as well as trading mechanics is outlined in what follows.

The following notation is used herein:

| | |
|---|---|
| Calculation Day t | scheduled trading day t on the Chicago Board Options Exchange (CBOE), New York Stock Exchange, American Stock Exchange and NASDAQ |
| $n_i$ | float-adjusted shares outstanding of stock i |
| m | number of assets minus one (SPX + number of stocks − 1) in the Index |
| i | indexing for an asset i where i = 0 corresponds to SPX and i ≥ 1 corresponds to stock |
| j | indexing for strikes j |
| $S_i^t$ | closing spot price of stock i on Calculation Day t |
| $S_{i=0}^t$ | closing spot price of SPX on Calculation Day t |
| ATM | At-the-money |
| OTM | Out-of-the-money |
| ITM | In-the-money |
| $\sigma_i^*$ | implied volatility for each asset i to the Option Expiration Date, as calculated using the CBOE VOLATILITY INDEX (VIX) methodology and all available strikes with non-zero bids on Tranche Start Date |
| $\sigma_i$ | implied volatility for each asset i to the Option Expiration Date, as calculated using the CBOE VIX methodology and bounded strikes |
| $\sigma_{i=0}$ | implied volatility for SPX to the SPX Option Expiration Date, as calculated using the CBOE VIX methodology and bounded strikes |
| $T_B^t$ | On Calculation Day t, the number of Business Days to Option Expiration divided by 252 |
| $T_C^t$ | On Calculation Day t, the actual number of calendar days to Option Expiration divided by 365 |
| K | strike (i.e., strike price) |
| $K_i^{t,0}$ | ATM strike for asset i on Calculation Day t |
| $R^t$ | risk-free interest rate, the yield of Treasury bills or notes to the relevant Option Expiration date. If no treasury maturity matches the Option Expiration date, then the interpolated yield of the two treasury contracts immediately preceding and following the Option Expiration date |
| $TBill^t$ | risk-free interest rate, the yield of the On-The-Run 6-month Treasury bill |
| $Spread^t$ | Funding spread, where the annualized default spread is 0.55%. Spread$^t$ will be updated at each Tranche Start Date to reflect the most recent market value. However, if the Index Sponsor determines that funding costs have increased significantly prior to Tranche End Date, then Spreadt will equal the new rate as of Calculation Day t. |

-continued

| | |
|---|---|
| $Q(K_{i,j})$ | midmarket price of option with strike $K_{i,j}$ |
| $\Delta K_{i,j}$ | interval between strike prices for asset i at strike j $$\Delta K_{i,j} = \frac{K_{i,j+1} - K_{i,j-1}}{2}$$ ($\Delta K$ for lowest strike is the difference between the lowest strike and the next higher strike. $\Delta K$ for highest strike is the difference between the highest strike and the next lower strike. $\Delta K$ for the atm strike is the difference between the next higher strike and the next lower strike, multiplied by 0.5.) |
| $C_i^{t,0}$ | midmarket price of call option with ATM strike |
| $P_i^{t,0}$ | midmarket price of put option with ATM strike |
| $d_i^t$ | dividend amount on ex-date t for asset i |
| $N(x)$ | the standard normal cumulative distribution function |
| $R_{borrowi}^{t-1}$ | Borrow Cost on Calculation Day t-1, where the annualized default borrow cost is 0.10%. However, if the Index Sponsor determines that the cost to borrow stock $S_i^t$ has increased significantly, then $R_{BCi}^t$ will equal the new rate as of Calculation Day t. Note that there is no Borrow Cost for short positions in SPX. |
| days$^t$ | Number of calendar days from and including Calculation Day t-1 to but excluding Calculation Day t |
| $I_0$ | Index closing level on Tranche Start Date |

In some embodiments, a stock tracking basket is created. In certain embodiments, on the close of each tranche start date, the components of a particular market index (e.g., the SPX) are ranked by market capitalization, with the top N stocks 22 selected as the tracking basket. In some embodiments, the top 50 stocks 22 from the SPX are selected as the SPX tracking basket. In other embodiments, another amount of top stocks 22 and/or another market index may be used. While the following examples may use the top 50 stocks 22 from the SPX, it should be understood that any appropriate number of top stocks 22 and/or any appropriate market index may be used.

For each selected stock 22, a weight may be computed by dividing the individual market capitalization by the total market capitalization of the 50-stock basket according to the following equation:

$$\text{weight}_i = \frac{n_i S_i}{\sum_{i=1}^{50} n_i S_i}$$

If a certain predetermined financial stock is in the top 50 (e.g., BAC), it may be excluded and its weight proportionally allocated among other financial stocks, for example, JPM, WFC, C and GS, on a market capitalization weighted basis. Thus, if the predetermined financial stock is in the top 50, there will be 49 stocks in the SPX tracking basket.

In certain embodiments, options 24 and 26 are selected to be used in correlation index 18. In some embodiments, quantities are determined for the selected options 24 and 26 and VIX implied volatilities 34 are computed. For example, on each Tranche Start Date, a new option portfolio is selected using the following criteria for the expiration, strikes, option type and quantity of options:

Tranche Start Date=November Listed Expiry of year Y
Tranche End Date=November Listed Expiry of year Y+1
Single Stock Option Expiration=January Listed Expiry of year Y+2
SPX Option Expiration=December Listed Expiry of year Y+1

For example, on the Tranche Start Date in November 2010, the expiration date used for the single stock components is January 2012 and for the Index components December 2011.

The Tranche End Date and the following Tranche Start Date would be in November 2011. While the following examples may use the months listed above for Tranche Start Date, Tranche End Date, Single Stock Option Expiration and SPX Option Expiration, it should be understood that any appropriate date may be used.

At each Tranche End Date, the positions held are liquidated and cash settled with the single stock option positions sold on the bid and the SPX option positions bought back on the offer. At each Tranche Start Date, new positions start at mid-market value, which is the average of bid and ask.

For SPX and each stock i=0, . . . , m, some embodiments use all strikes between an upper standard deviation and a lower standard deviation for the option portfolio. The standard deviation may be between any appropriate upper and lower limit. For example, the upper limit of the standard deviation may be up to +3, inclusive, and the lower limit of the standard deviation may be as low as −4, inclusive. As a specific example, strikes between −2.5 standard deviations and +1.5 standard deviations are used:

$$F_i^{t=0} \times e^{\left(-2.5 \times \sigma_i^* \times \sqrt{T_C}\right)} \leq K \leq F_i^{t=0} \times e^{\left(+1.5 \times \sigma_i^* \times \sqrt{T_C}\right)}$$

Where the implied volatility, $\sigma^*_i$, is calculated in some embodiments using the CBOE VIX methodology for all available listed strikes with non-zero bids on the Tranche Start Date. While the CBOE VIX methodology is discussed herein as an example, any other appropriate method of determining volatility may be used.

In some embodiments, the initial implied volatility 34, $\sigma_i$, is then calculated, also using the CBOE VIX methodology (or any other appropriate method of determining volatility), but based on the bounded option portfolio on Tranche Start Date. If two consecutive single stock put (call) options have bid premiums strictly less than a certain amount, such as $0.02, some embodiments may remove both contracts and all puts with a lower strike (calls with a higher strike) from the portfolio. If the lowest (highest) strike single stock put (call) in the portfolio is less than $0.02, some embodiments may remove the contract. If two consecutive SPX put (call) options have bid premiums strictly less than another amount such as $0.05, some embodiments may remove both contracts and all puts with a lower strike (calls with a higher strike) from the portfolio. If the lowest strike SPX put (highest strike SPX call) in the portfolio is less than $0.05, some embodiments may remove the contract. The implied volatility 34 is defined as:

$$\sigma_i^2 = \frac{2}{T_B^t} \sum_j \frac{\Delta K_{i,j}}{K_{i,j}^2} e^{R^t T^t_C} Q(K_{i,j}) - \frac{1}{T_B^t}\left[\frac{F_i^t}{K_i^{t,0}} - 1\right]^2$$

The VIX formula used in some embodiments is described in the CBOE white paper, available on the CBOE website at www.cboe.com/micro/vix/vixwhite.pdf, which is incorporated herein by reference. Note that the above formula for implied volatility uses both business and calendar days whereas VIX only uses calendar days.

On each Calculation Day t, the forward computation for SPX and stocks, is defined as:

$$F_i^t = \text{Strike Price}_i^t + e^{R^t T^t}(C_i^{t,0} - P_i^{t,0})$$

Some embodiments select as the StrikePrice$_i^t$, the strike of the Call and Put with the lowest absolute price difference based on all available listed strikes on Calculation Day t.

Some embodiments next determine $K_i^{t,0}$, which is the listed strike immediately below the forward, $F_i^t$.

In some embodiments, a quantity of options 24 and 26 are selected. For SPX, stocks and strikes above, OTM calls or OTM puts, centered around $K_i^{t=0,0}$, are selected on the Tranche Start Date. OTM calls have strikes$>K_i^{t=0,0}$, OTM puts have strikes$<K_i^{t=0,0}$ and calls and puts are selected for strike $K_i^{t=0,0}$. Thus, both calls and puts are selected for strike $K_i^{t=0,0}$ whereas either a call or a put is selected at every other strike.

In some embodiments, the implied volatilities of each put and call pair are weighted through a linear interpolation to arrive at a single at-the-money implied volatility, $\sigma_i$. Once selected on the Tranche Start Date, the quantity of options and implied volatility will be fixed until the Tranche End Date, unless removed due to a small premium.

In some embodiments, the Quantity of options for each strike is defined as:

$$\text{Quantity}_{Stock=i,Strike=j}^{t=0} = 100 \times \frac{\text{weight}_i \times \text{Vega Notional}_{stocks}}{\sigma_i} \times \frac{\Delta K_{i,j}}{T_B \times K_{i,j}^2}$$

where $\sigma_i$ is the implied volatility for stock i=1, ..., m on the Tranche Start Date using the bounded option portfolio.

$$\text{Quantity}_{i=0,Strike=j}^{t=0} = -100 \times \frac{\text{Vega Notional}_{SPX}}{\sigma_{i=0}} \times \frac{\Delta K_{i,j}}{T_B \times K_{i,j}^2}$$

In certain embodiments, the quantity of options is rounded to the nearest integer.

The Vega Notional for SPX from the computed volatilities is given by:

$$VegaNotional_{i=1} = \frac{\sum_{i=1}^{m} \text{weight}_i \sigma_i}{\sigma_{i=0}} \times VegaNotional_{Stocks}$$

where Vega Notional$_{Stocks}$ is determined at the launch of each Tranche.

In some embodiments, daily option portfolio maintenance is performed and option deltas 42 are calculated. For example, on each calculation day, at the scheduled closing time of the relevant Exchange, starting from but excluding the Tranche Start Date up to but excluding the Tranche End Date, options may be removed from the portfolio based on the following criteria.

Some embodiments include a small premium exclusion for OTM options. For example, if two consecutive single stock put (call) options have bid premiums strictly less than an amount such as $0.02 over two consecutive Calculation Days, some embodiments may remove both contracts and all puts with a lower strike (calls with a higher strike) at a price of zero on Calculation Day t and each subsequent Calculation Day up to and including Tranche End Date:

If AND(Bid_Price$_{i,j-1}^t$, Bid_Price$_{i,j}^t$, Bid_Price$_{i,j-1}^{t-1}$, Bid_Price$_{i,j}^{t-1}$)<0.05, then Quantity$_{i,p}^t$=0 for i>0 and all p such that $K_{i,p} \leq K_{i,j}$ for put strikes or $K_{i,p} \geq K_{i,j-1}$ for call strikes.

In addition, if the lowest strike put (highest strike call) in the remaining portfolio is less than an amount such as $0.02 over two consecutive Calculation Days, some embodiments may remove the contract.

If two consecutive SPX put (call) options have a bid premiums strictly less than an amount such as $0.05 over two consecutive Calculation Days, some embodiments may remove both contracts and all puts with a lower strike (calls with a higher strike) at a price of zero on Calculation Day t and each subsequent Calculation Day up to and including the Tranche End Date:

If AND(Bid_Price$_{i,j-1}^t$, Bid_Price$_{i,j}^t$, Bid_Price$_{i,j-1}^{t-1}$, Bid_Price$_{i,j}^{t-1}$)<0.05, then Quantity$_{i,p}^t$=0 for i=0 and all p such that $K_{i,p} \leq K_{i,j}$ for put strikes or $K_{i,p} \geq K_{i,j-1}$ for call strikes.

In addition, if the lowest strike put (highest strike call) in the remaining portfolio is less than an amount such as $0.05 over two consecutive Calculation Days, some embodiments may remove the contract.

Some embodiments include a small premium exclusion for deep ITM options. For example, if two consecutive calls (puts) are deep ITM and the corresponding consecutive puts (calls) with the same strikes fall under the above criteria for SPX or single stock contract omission over two consecutive Calculation Days, some embodiments may then remove the calls (puts) and any calls (puts) with a lower (higher) strike on Calculation Day t and each subsequent Calculation Day up to and including the Tranche End Date. In addition, if the highest strike put (lowest strike call) in the remaining portfolio falls under the above criteria over two consecutive Calculation Days, some embodiments may remove the contract. Deep ITM options are unwound at closing market bid or ask prices on Calculation Day t and the cash settlement amount, OptionUnwind$_{i,j}^t$, added to Daily P&L$^t$ and Funding$^t$.

In the case of an ITM put for i≥1:

If AND[($K_{i,j-1} - S_i^t$)>0, Call$_{i,j}^t$<0.02, ($K_{i,j} - S_i^t$)>0, Call$_{i,j}^t$<0.02, ($K_{i,j-1} - S_i^{t-1}$)>0, Call$_{i,j-1}^{t-1}$<0.02, ($K_{i,j} - S_i^{t-1}$)>0, Call$_{i,j}^{t-1}$<0.02]$^t$ then Quantity$_{i,p-1}^t$=0 for all put strikes $K_{i,p-1} \geq K_{i,j-1}$.

In the case of an ITM call for i≥1:

If AND[($S_i^t - K_{i,j-1}$)>0, Put$_{i,j-1}^t$<0.02, ($S_i^t - K_{i,j}$)>0, Put$_{i,j}^t$<0.02, ($S_i^{t-1} - K_{i,j-1}$)>0, Put$_{i,j-1}^{t-1}$<0.02, ($S_i^{t-1} - K_{i,j}$)>0, Put$_{i,j}^{t-1}$<0.02]$^t$ then Quantity$_{i,p-1}^t$=0 for all call strikes $K_{i,p-1} \leq K_{i,j}$.

For all other strikes that were not omitted from the option portfolio, the quantity is fixed from Tranche Start Date.

In some embodiments, the deltas 42 held against the options portfolio are computed. The implied volatility used in the delta computation is the volatility determined above on Tranche Start Date. As used herein, "deltas" may include index deltas and stock deltas. Index deltas may refer to changes in prices of index options 24 with respect to the underlying index. Stock deltas may refer to changes in prices of stock options 26 with respect to the underlying stocks. For i≥0 and strikes j, deltas 42 in some embodiments are then calculated at the close using the Black-Scholes formula:

$$\text{Call Delta}_{i,j}^t = S_i^t \times N(d1_{i,j}^t)$$

$$\text{Put Delta}_{i,j}^t = S_i^t \times \lfloor N(d1_{i,j}^t) - 1 \rfloor$$

where $$d1_{i,j}^t = \frac{\ln(F_i^t / K_{i,j}) + 0.5 \times (\sigma_i)^2 \times T_B}{\sigma_i \sqrt{T_B}}$$

The forward, $F_i^t$, is defined as:

$$F_i^t = \text{Strike Price}_i^t + e^{R^t T c^t}(C_i^{t,0} - P_i^{t,0})$$

In some embodiments, daily Profit and Loss (the "Daily P&L") 62 is computed based on the change in the value of the option portfolio, the cumulative delta and interest on funding 64. Funding includes change of value of the option portfolio, cash generated from unwind of deep ITM options, cost to borrow stock and SPX or stock delta trading.

$$\text{Daily } P\&L^t = \sum_{t=0}^{m}(PVoptionPortfolio_i^t - PVoptionPortfolio_i^{t-1}) -$$

$$\sum_{t=0}^{m}\sum_{j}(\Delta S_i^t \times \text{Delta}_{i,j}^{t-1} \times \text{Quantity}_{i,j}^{t-1}) -$$

$$\sum_{t=1}^{m}\left(\text{Borrow}_i^{t-1} \times R_{borrow}^{t-1} \times \frac{\text{days}^t}{360} + \right.$$

$$\sum_{i=0}^{m}\sum_{j}(OptionUnwind_{i,j}^t) - \left(\text{Funding}^{t-1} \times R_{funding}^{t-1} \times \frac{\text{days}^t}{360}\right)$$

where
PVoptionPortfolio$_i^t$=present value on Calculation Day t of the option portfolio based on midmarket option prices for asset i $\Delta S_i^t = (S_i^t - S_i^{t-1} + d_i^t)/S_i^{t-1}$ Deta$_{i,j}^{t-1}$=either Call Delta or Put Delta depending on option type for Calculation Day t-1
OptionUnwind$_{i,j}^t$=zero for as set i and strike j, unless an unwind occurred, in which case it is the cash settlement amount of deep ITM options unwound on Calculation Day t.

$$\text{Borrow}_i^{t-1} = \sum_{j} \text{Delta}_{i,j}^{t-1} \times \text{Quantity}_{i,j}^{t-1}$$

If Borrow$_i^{t-1}$>0 for stock i, then R$_{borrow_i}^{t-1}$ is as defined above, otherwise R$_{borrow_i}^{t-1}$=0.

$$\text{Funding}^t = \text{Funding}^{t-1} + \sum_{i=0}^{m}(PVoptionPortfolio_i^t - PVoptionPortfolio_i^{t-1}) -$$

$$\sum_{i=0}^{m}\sum_{j}(\Delta S_t^i \times \text{Delta}_{i,j}^{t-1} \times \text{Quantity}_{i,j}^{t-1}) -$$

$$\sum_{t=1}^{m}\left(\text{Borrow}_t^{j-1} \times R_{borrowi}^{t-1} \times \frac{\text{days}^t}{360}\right) -$$

$$\sum_{i=0}^{m}\left[S_i^t \times \left(\sum_{j}\frac{\text{Delta}_{i,j}^t \times \text{Quantity}_{i,j}^t}{S_i^t} - \sum_{j}\frac{\text{Delta}_{i,j}^{j-1} \times \text{Quantity}_{i,j}^{j-1}}{S_t^{i-1}}\right)\right]$$

If Funding$^{t-1}$>0, R$_{funding}^{t-1}$=TBill$^{t-1}$+spread$^{t-1}$, otherwise R$_{funding}^{t-1}$=TBill$^{t-1}$.

In some embodiments, the closing level of correlation index 18 (excess return) is computed. The Index closing level on Index Calculation Day t, I$_t$, is defined as:

$$I_t = I_{t-1} + \frac{\text{Daily}P\&L^t}{\text{multiplier}}$$

where:
I$_{t-1}$=Index closing level on Index Calculation Day t-1
I$_0$=100.00
multiplier=VegaNotional$_{Stocks}$ In some embodiments, the calculations described above may be adjusted for corporate actions, including, but not limited to, stock splits, special dividends, mergers, acquisitions, spin-offs, bankruptcies and delistings. Corporate actions may be applied after the close of trading on the Calculation Day prior to ex-date. Removal of a component due to bankruptcy may be done the day after the official announcement, at the close. For example, if the bankruptcy filing is on Tuesday, removal may occur on Wednesday at the market close.

The following table lists example adjustment guidelines for various corporate actions.

| Corporate Action | Possible Adjustment |
|---|---|
| acquisition - stock | Remove from basket |
| acquisition - cash before expiration | Remove from basket |
| acquisition - cash after expiration | No adjustment |
| acquisition - stock & cash | Remove from basket |
| merger | Remove from basket |
| spin-off | Remove from basket |
| special dividend - strike adjustment | Follow listed option adjustment |
| special dividend - other | Remove from basket |
| bankruptcy | Remove from basket |
| delisting | Remove from basket |
| splits | Replace with split-adjusted options |

Removals may be made at the close on the Calculation Day immediately following the announcement and executed at market bid and ask prices with cash settlement added to Funding$^t$ as part of OptionUnwind$^t$. Any Corporate Actions not listed above may be adjusted by an Index Sponsor in a commercially reasonable manner consistent with the methodologies above.

If the total weight of stocks removed from the basket exceeds 3% (or any other appropriate percentage), then the corresponding amount of SPX options may be removed. For example, if 5% of stocks have been removed, then 5% of the quantity of SPX options at each strike will also be removed, rounded to the nearest integer.

If a Market Disruption Event occurs, as determined by the Index Sponsor in its sole discretion, on a Calculation Day, the Index closing level may be adjusted in certain embodiments using the most recently published market prices.

Furthermore, due to widening market bid and ask prices from such an event, the Index Sponsor may opt to include options that would have otherwise been removed during Option Portfolio Maintenance. The Index Sponsor, in its sole discretion, may adjust the methodology of the Index such that it can be calculated in a practical manner. If a market disruption occurs for five or more consecutive Calculation Days, the Index Sponsor will determine the level of the Index in a commercially reasonable manner.

Should the level of the Index on any Calculation Day be at or below 10% of the initial Tranche level, the Index Sponsor may, but is not obligated to, unwind the Index tranche at the prevailing market bid and ask prices. The final level at which the Index is unwound will be determined by the Index Sponsor in its sole discretion.

In some embodiments, the source of option prices used in the Index methodology is the CBOE. Source of stock prices is the primary exchange on which the stock is listed.

Figure 2:
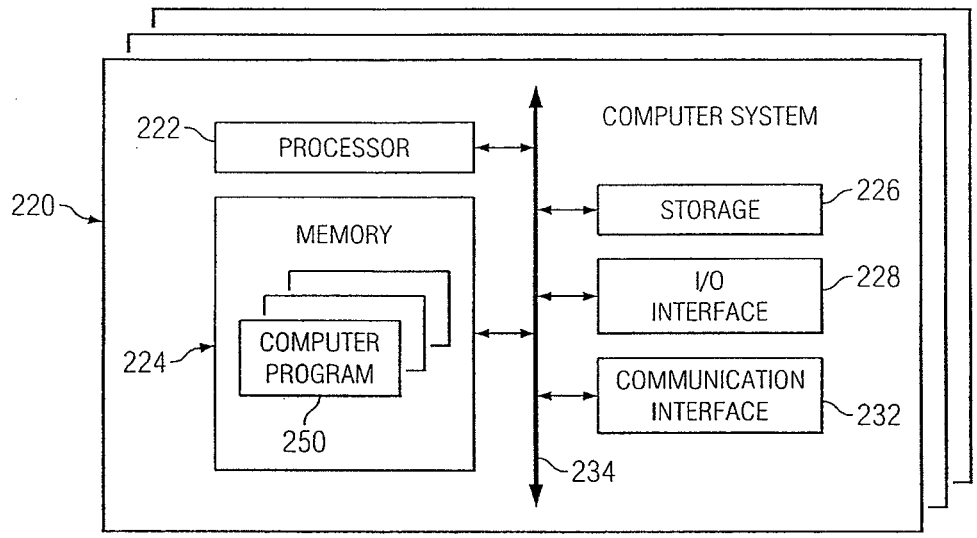
FIG. 2 is a system where particular embodiments of the disclosure may be implemented.

FIG. 2 is block diagram illustrating a portion of a processing/computing system 220 that may be used to provide correlation index 18 according to one embodiment. Computing system 220 performs one or more steps of one or more methods described or illustrated herein. In particular embodiments, one or more computing systems 220 provide functionality described or illustrated herein. In particular embodiments, software running on one or more computing systems 220 (i.e., a computer program 250) performs one or more steps of one or more methods described or illustrated herein or provides functionality described or illustrated herein. Particular embodiments include one or more portions of one or more computing systems 220.

Computing system 220 may be in any suitable physical form. As example and not by way of limitation, computing system 220 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a server, an application server, or a combination of two or more of these. Where appropriate, computing system 220 may include one or more computing systems 220; be unitary or distributed; span multiple locations; span multiple machines; or reside in a cloud, which may include one or more cloud components in one or more networks. Where appropriate, one or more computing systems 220 may perform without substantial spatial or temporal limitation one or more steps of one or more methods described or illustrated herein. As an example and not by way of limitation, one or more computing systems 220 may perform in real time or in batch mode one or more steps of one or more methods described or illustrated herein. One or more computing systems 220 may perform at different times or at different locations one or more steps of one or more methods described or illustrated herein, where appropriate.

In some embodiments, computing system 220 may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems. In some embodiments, computing system 220 may be a web server running web server applications such as Apache, Microsoft's Internet Information Server™, and the like.

In particular embodiments, computing system 220 includes a processor 222, memory 224, storage device 226, an input/output (I/O) interface 228, a communication interface 232, and a bus 234. Although this disclosure describes and illustrates a particular computing system 220 having a particular number of particular components in a particular arrangement, this disclosure contemplates any suitable computing system 220 having any suitable number of any suitable components in any suitable arrangement.

In particular embodiments, processor 222 includes hardware for executing instructions, such as those making up computer program 250. As an example and not by way of limitation, to execute instructions, processor 222 may retrieve (or fetch) the instructions from an internal register, an internal cache, memory 224, or storage device 226; decode and execute the instructions; and then write one or more results to an internal register, an internal cache, memory 224, or storage device 226. In particular embodiments, processor 222 may include one or more internal caches for data, instructions, or addresses. This disclosure contemplates processor 222 including any suitable number of any suitable internal caches, where appropriate. As an example and not by way of limitation, processor 222 may include one or more instruction caches, one or more data caches, and one or more translation lookaside buffers (TLBs). Instructions in the instruction caches may be copies of instructions in memory 224 or storage device 226, and the instruction caches may speed up retrieval of those instructions by processor 222. Data in the data caches may be copies of data in memory 224 or storage device 226 for instructions executing at processor 222 to operate on; the results of previous instructions executed at processor 222 for access by subsequent instructions executing at processor 222 or for writing to memory 224 or storage device 226; or other suitable data. The data caches may speed up read or write operations by processor 222. The TLBs may speed up virtual-address translation for processor 222. In particular embodiments, processor 222 may include one or more internal registers for data, instructions, or addresses. This disclosure contemplates processor 222 including any suitable number of any suitable internal registers, where appropriate. Where appropriate, processor 222 may include one or more arithmetic logic units (ALUs); be a multi-core processor; or include one or more processors 222. Although this disclosure describes and illustrates a particular processor, this disclosure contemplates any suitable processor.

In particular embodiments, memory 224 includes main memory for storing instructions such as computer program 250 for processor 222 to execute, or data such as text 105 for processor 222 to operate on. As an example and not by way of limitation, computer system 220 may load instructions from storage device 226 or another source (e.g., another computing system 220) to memory 224. Processor 222 may then load the instructions from memory 224 to an internal register or internal cache. To execute the instructions, processor 222 may retrieve the instructions from the internal register or internal cache and decode them. During or after execution of the instructions, processor 222 may write one or more results (which may be intermediate or final results) to the internal register or internal cache. Processor 222 may then write one or more of those results to memory 224. In particular embodiments, processor 222 executes only instructions in one or more internal registers or internal caches or in memory 224 (as opposed to storage device 226 or elsewhere) and operates only on data in one or more internal registers or internal caches or in memory 224 (as opposed to storage device 226 or elsewhere). One or more memory buses 234 (which may each include an address bus and a data bus) may couple processor 222 to memory 224. Bus 234 may include one or more memory buses, as described below. In particular embodiments, one or more memory management units (MMUs) reside between processor 222 and memory 224 and facilitate accesses to memory 224 requested by processor 222.

In certain embodiments, instructions executed by processor 222 may reside in one or more computer programs 250. A computer program generally refers to instructions, logic, rules, algorithms, code, tables, or other suitable instructions for performing the described functions and operations. In some embodiments, computer program 250 may be stored in memory 224, storage device 226, or any other location accessible to computing system 220. Where appropriate, a computer program may include one or more computer programs; be unitary or distributed; span multiple locations; span multiple machines; or reside in a cloud.

In particular embodiments, storage device 226 includes mass storage for data or instructions. As an example and not by way of limitation, storage device 226 may include an HDD, a floppy disk drive, flash memory, an optical disc, a magneto-optical disc, magnetic tape, a Universal Serial Bus (USB) drive, a solid-state drive (SSD), or a combination of two or more of these. Storage device 226 may include removable or non-removable (or fixed) media, where appropriate.

Storage device 226 may be internal or external to computing system 220, where appropriate. In particular embodiments, storage device 226 is non-volatile, solid-state memory. In particular embodiments, storage device 226 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates storage device 226 taking any suitable physical form. Storage device 226 may include one or more storage control units facilitating communication between processor 222 and storage device 226, where appropriate. Where appropriate, storage device 226 may include one or more storage device 226. Although this disclosure describes and illustrates particular storage, this disclosure contemplates any suitable storage.

In particular embodiments, I/O interface 228 includes hardware, software, or both providing one or more interfaces for communication between computing system 220 and one or more I/O devices. System 220 may include one or more of these I/O devices, where appropriate. One or more of these I/O devices may enable communication between a user and computing system 220. As an example and not by way of limitation, an I/O device may include a keyboard, keypad, microphone, monitor, mouse, printer, scanner, speaker, still camera, stylus, tablet, touchscreen, trackball, video camera, sensor, another suitable I/O device or a combination of two or more of these. This disclosure contemplates any suitable I/O devices and any suitable I/O interfaces 228 for them. Where appropriate, I/O interface 228 may include one or more devices or software drivers enabling processor 222 to drive one or more of these I/O devices. I/O interface 228 may include one or more I/O interfaces 228, where appropriate. Although this disclosure describes and illustrates a particular I/O interface 228, this disclosure contemplates any suitable I/O interface 228.

In particular embodiments, communication interface 232 includes hardware, software, or both providing one or more interfaces for communication (e.g., packet-based communication and facsimile communication) between computing system 220 and one or more other computing systems 220. As an example and not by way of limitation, communication interface 232 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 232 for it. As an example and not by way of limitation, computing system 220 may communicate with an ad hoc network, a personal area network (PAN), a local area network (LAN), a wide area network (WAN), a metropolitan area network (MAN), one or more portions of the Internet, a PSTN, or a combination of two or more of these. One or more portions of one or more of these networks may be wired or wireless. As an example, computing system 220 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. Computing system 220 may include any suitable communication interface 232 for any of these networks, where appropriate. Communication interface 232 may include one or more communication interfaces 31, where appropriate. Although this disclosure describes and illustrates a particular communication interface, this disclosure contemplates any suitable communication interface.

In particular embodiments, bus 234 includes hardware, software, or both coupling components of computing system 220 to each other. As an example and not by way of limitation, bus 234 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 234 may include one or more buses 234, where appropriate. Although this disclosure describes and illustrates a particular bus, this disclosure contemplates any suitable bus or interconnect.

The components of system 220 may be integrated or separated. In some embodiments, components of system 220 may each be housed within a single chassis. The operations of system 220 may be performed by more, fewer, or other components. Additionally, operations of system 220 may be performed using any suitable logic that may comprise software, hardware, other logic, or any suitable combination of the preceding.

Figure 3:
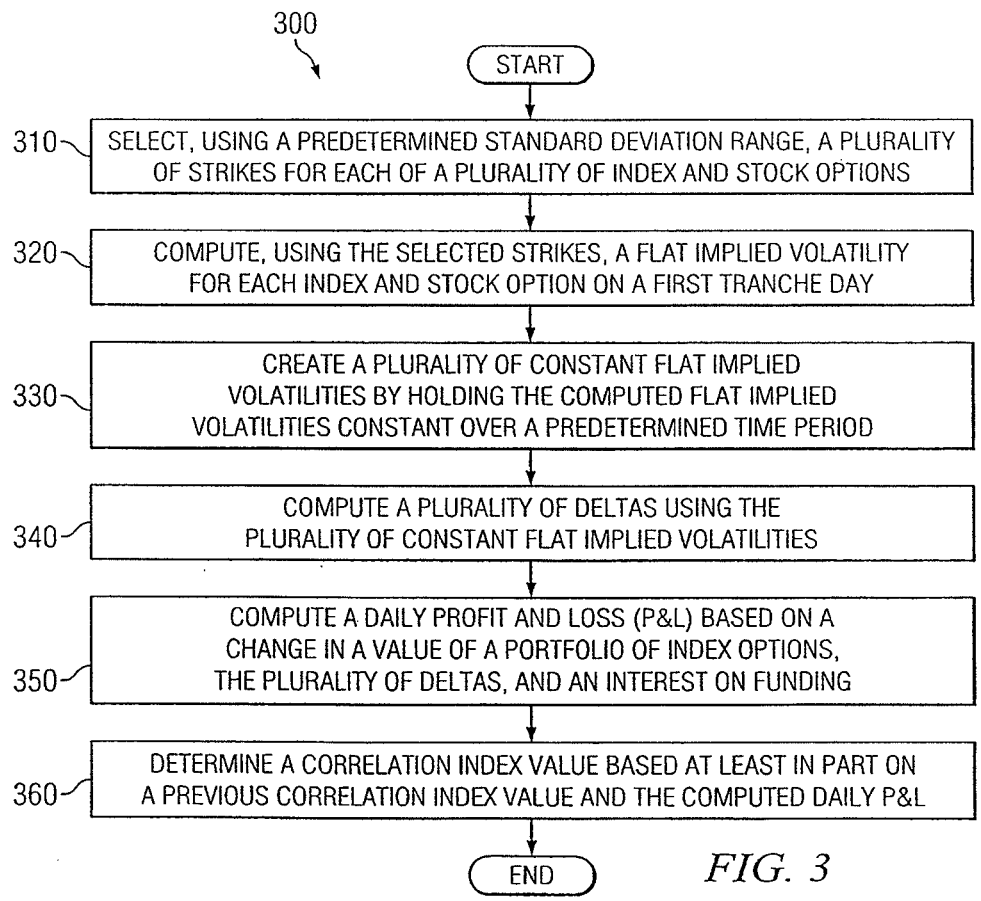
FIG. 3 is a chart depicting a method for providing a correlation index, according to certain embodiments

FIG. 3 illustrates a method 300 for providing a correlation index according to certain embodiments. The provided correlation index may refer to correlation index 18 described above. Method 300 begins in step 310 where a plurality of strikes for each of a plurality of index and stock options is selected. In some embodiments, the strikes are selected using a predetermined standard deviation range as described above. In certain embodiments, the plurality of strikes may refer to strikes 32 described above.

In step 320, a flat implied volatility for each index and stock option is computed using the selected strikes of step 310. In some embodiments, the flat implied volatilities are computed on a first tranche day. In some embodiments, the flat implied volatilities may refer to flat implied volatilities 34 described above.

In step 330, a plurality of constant flat implied volatilities are created by holding the computed flat implied volatilities constant over a predetermined time period. In step 340, a plurality of deltas is computed on a daily basis using the plurality of constant flat implied volatilities of step 330. In some embodiments, the deltas may refer to deltas 42 described above.

In step 350, a daily profit and loss (P&L) is computed based on a change in a value of a portfolio of index options, stock options, the plurality of deltas of step 340, interest on cost to borrow stock, and an interest on funding. In some embodiments, the interest on funding may refer to interest on funding 64 described above.

In step 360, a correlation index value is determined based at least in part on a previous correlation index value and the computed daily P&L of step 350. After step 360, method 300 ends.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a SSD, a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
    a memory operable to store a correlation index that is based at least in part on:
        a portfolio of index options associated with an index;
        a plurality of stock options associated with a plurality of stocks; and
        a plurality of deltas computed using a plurality of constant flat implied volatilities, the plurality of deltas comprising:
            a plurality of index deltas that indicate changes in prices of the index options with respect to the index; and
            a plurality of stock deltas that indicate changes in prices of the stock options with respect to the plurality of stocks; and
    a processor communicatively coupled to the memory and operable to determine a value of the correlation index by:
        selecting, using a predetermined standard deviation range, a plurality of strike prices for each of the index and stock options;
        computing on a first date, using the selected strike prices, a flat implied volatility for the index and the plurality of stocks;
        holding the computed flat implied volatilities constant over a predetermined time period, thereby creating the plurality of constant flat implied volatilities;
        computing the plurality of deltas using the plurality of constant flat implied volatilities;
        computing a daily profit and loss (P&L) based on a change in a value of the portfolio of index and stock options, the plurality of deltas, an interest on cost to borrow stock, and an interest on funding; and
        determining a current correlation index value based at least in part on a previous correlation index value and the computed daily P&L.

2. The system of claim 1, wherein the predetermined standard deviation range comprises a lower limit and an upper limit, the lower limit being up to −4 inclusive, and the upper limit being up to +3 inclusive.

3. The system of claim 1, wherein the previous correlation index value comprises a closing correlation index value on an immediately preceding day.

4. A method of determining a value of a correlation index, the method comprising:
    selecting, by one or more computing systems, a plurality of strike prices for each of a portfolio of index options and a plurality of stock options;
    computing, by the one or more computing systems, a flat implied volatility for the correlation index and a plurality of stocks associated with the plurality of stock options;
    computing, by the one or more computing systems, a plurality of deltas using a plurality of constant flat implied volatilities;
    computing, by the one or more computing systems, a daily profit and loss (P&L) based at least on:
        a change in a value of the portfolio of index options;
        a change in value of the plurality of stock options; and
        the plurality of deltas; and
    determining, by the one or more computing systems, a current correlation index value based at least in part on a previous correlation index value and the computed daily P&L.

5. The method of claim 1, further comprising:
    holding, by the one or more computing systems, the computed flat implied volatilities constant over a predetermined time period, thereby creating the plurality of constant flat implied volatilities.

6. The method of claim 1, the computed daily P&L further based on:
    an interest on cost to borrow stock; and
    an interest on funding.

7. The method of claim 1, wherein the plurality of deltas comprise:
    a plurality of index deltas that indicate changes in prices of the index options with respect to the index; and
    a plurality of stock deltas that indicate changes in prices of the stock options with respect to the plurality of stocks.

8. The method of claim 1, wherein the plurality of strike prices for each of the portfolio of index options and the plurality of stock options are selected using a predetermined standard deviation range.

9. The method of claim 8, wherein the predetermined standard deviation range comprises a lower limit and an upper limit, the lower limit being up to −4 inclusive, and the upper limit being up to +3 inclusive.

10. The method of claim 1, wherein the flat implied volatility is computed on a first date using the selected strike prices.

11. The method of claim 1, wherein the previous correlation index value comprises a closing correlation index value on an immediately preceding day.

12. One or more computer-readable non-transitory storage media embodying software this is operable when executed by one or more computer systems to determine a value of a correlation index by:
    selecting a plurality of strike prices for each of a portfolio of index options and a plurality of stock options;

computing a flat implied volatility for the correlation index and a plurality of stocks associated with the plurality of stock options;

computing a plurality of deltas using a plurality of constant flat implied volatilities;

computing a daily profit and loss (P&L) based at least on:
 a change in a value of the portfolio of index options;
 a change in value of the plurality of stock options; and
 the plurality of deltas; and determining a current correlation index value based at least in part on a previous correlation index value and the computed daily P&L.

13. The media of claim 12, further operable to:

hold the computed flat implied volatilities constant over a predetermined time period, thereby creating the plurality of constant flat implied volatilities.

14. The media of claim 12, the computed daily P&L further based on:

an interest on cost to borrow stock; and an interest on funding.

15. The media of claim 12, wherein the plurality of deltas comprise:

a plurality of index deltas that indicate changes in prices of the index options with respect to the index.

16. The media of claim 15, wherein the plurality of deltas further comprise:

a plurality of stock deltas that indicate changes in prices of the stock options with respect to the plurality of stocks.

17. The media of claim 12, wherein the plurality of strike prices for each of the portfolio of index options and the plurality of stock options are selected using a predetermined standard deviation range.

18. The media of claim 17, wherein the predetermined standard deviation range comprises a lower limit and an upper limit, the lower limit being up to −4 inclusive, and the upper limit being up to +3 inclusive.

19. The media of claim 12, wherein the flat implied volatility is computed on a first date using the selected strike prices.

20. The media of claim 12, wherein the previous correlation index value comprises a closing correlation index value on an immediately preceding day.

* * * * *